United States Patent [19]

Okamoto et al.

[11] 4,436,896

[45] Mar. 13, 1984

[54] POLYESTER COPOLYMER

[75] Inventors: Ichiro Okamoto; Yuzo Toga, both of Himeji, Japan

[73] Assignee: Daicel Chemical Industries, Ltd., Osaka, Japan

[21] Appl. No.: 418,120

[22] Filed: Sep. 14, 1982

[30] Foreign Application Priority Data

| Sep. 29, 1981 | [JP] | Japan | 56-154275 |
| Sep. 29, 1981 | [JP] | Japan | 56-154276 |
| Oct. 8, 1981 | [JP] | Japan | 56-161509 |
| Oct. 8, 1981 | [JP] | Japan | 56-161510 |

[51] Int. Cl.$^3$ ............................................. C08G 63/66
[52] U.S. Cl. .................................. 156/332; 427/385 R; 427/385.5; 525/408; 525/415; 528/301; 528/302; 528/305; 528/308.6; 528/308.7; 528/300
[58] Field of Search ............... 528/300, 301, 302, 305, 528/308.6, 308.7; 525/408, 415; 156/332

[56] References Cited

U.S. PATENT DOCUMENTS

| 3,975,323 | 8/1976 | Georgoudis et al. | 525/41.5 X |
| 4,052,368 | 10/1977 | Larson | 528/301 X |
| 4,062,907 | 12/1977 | Sublett | 528/302 X |
| 4,094,721 | 6/1978 | Strum | 528/308.7 X |
| 4,156,774 | 5/1979 | Buxbaum et al. | 528/301 X |
| 4,387,214 | 6/1983 | Passmore et al. | 528/305 X |
| 4,396,746 | 8/1983 | Toga | 528/300 X |

*Primary Examiner*—Lucille M. Phynes
*Attorney, Agent, or Firm*—Flynn, Thiel, Boutell & Tanis

[57] ABSTRACT

A polyester copolymer, suitable for an adhesive, is obtained by copolymerizing (A) terephthalic acid or a mixture of more than 50 mol % of terephthalic acid and at least one kind of dicarboxylic acid selected from aromatic dicarboxylic acids excluding terephthalic acid and aliphatic dicarboxylic acids, (B) a low-molecular weight diol composed of 1 to 50 mol % of 2-methyl-1,3-propanediol and 99 to 50 mol % of 1,6-hexanediol, and (C) at least one kind of high-molecular weight diol (in such an amount that the high-molecular weight diol component in the copolymer is 0 to 60 wt %) selected from polyalkylene ether glycol and polycaprolactone glycol.

4 Claims, No Drawings

POLYESTER COPOLYMER

BACKGROUND OF THE INVENTION

1. Field of the Invention

The present invention relates to a process for producing a new polyester copolymer, and more particularly, to a process for producing a polyester copolymer having a low melting point and a proper degree of crystallinity as compared with the conventional polyester copolymers.

2. Description of Prior Arts

Heretofore, linear polyester copolymers have found use in broad application areas such as films, moldings, and fibers. Generally speaking, some of such polyester copolymers have a high molecular weight and a high melting point if they have a proper degree of crystallinity, and they are not necessarily suitable for certain applications such as hot melt adhesives, binders for lamination, blending with other plastics, and polyester elastomers. In other words, what is required in such applications is usually a polyester copolymer having a comparatively low melting point and a proper degree of crystallinity.

Generally, a polyester copolymer is composed of a dicarboxylic acid component and a glycol component, and it is possible to vary the melting point and degree of crystallinity by selecting the kind of each of the two components. However, it is not uncommon that lowering the melting point is possible only with an extreme decrease in the degree of crystallinity; in an extreme case, the copolymer becomes amorphous. Thus it is difficult to balance the melting point with the degree of crystallinity.

SUMMARY OF THE INVENTION

After extensive studies, the present inventors found that it is possible to control easily the balance between the melting point and the degree of crystallinity if a mixture of 1,6-hexanediol and 2-methyl-1,3-propanediol is used as the glycol component, and such a polyester copolymer has a considerably low melting point and yet a proper degree of crystallinity.

Thus the gist of this invention resides in a process for producing a polyester copolymer which comprises copolymerizing (A) terephthalic acid or a mixture of not less than 50 mol % of terephthalic acid and at least one kind of dicarboxylic acid selected from aromatic dicarboxylic acids excluding terephthalic acid and aliphatic dicarboxylic acids, (B) a low-molecular weight diol composed of 1 to 50 mol % of 2-methyl-1,3-propanediol and 99 to 50 mol % of 1,6-hexanediol, and (C) at least one kind of high-molecular weight diol (in such an amount that the high-molecular weight diol component in the copolymer is 0 to 60 wt %) selected from polyalkylene ether glycol and polycaprolactone glycol. Said terephthalic acid and dicarboxylic acid may be in the form of an ester-forming derivative thereof.

The preferred dicarboxylic acid component used in this invention is terephthalic acid. It is also possible to use a mixture of more than 50 mol % of terephthalic acid and at least one kind of dicarboxylic acid selected from aromatic dicarboxylic acids excluding terephthalic acid and aliphatic dicarboxylic acids.

The above-mentioned dicarboxylic acid includes, aromatic dicarboxylic acids such as isophthalic acid, phthalic acid, 2,6-naphthalenedicarboxylic acid, diphenyl-p,p'-dicarboxylic acid, bis(p-carboxyphenyl)methane, anthracenedicarboxylic acid, ethylenebis-p-benzoic acid, and 1,4-tetramethylenebis-p-benzoic acid. The above-mentioned aliphatic dicarboxylic acid includes, for example, adipic acid, suberic acid, azelaic acid, sebacic acid, and dodecanedioic acid. Alicyclic dicarboxylic acids such as 1,4-cyclohexanedicarboxylic acid are also included. In addition, a polybasic acid such as trimellitic acid and pyromellitic acid may be mixed in a small quantity depending on applications.

The low-molecular weight diol used in this invention should be a mixture of 1 to 50 mol % of 2-methyl-1,3-propanediol and 99 to 50 mol % of 1,6-hexanediol. 2-Methyl-1,3-propanediol has one methyl group on the side chain and has an asymmetric structure. This diol makes irregular the structure of the polyester copolymer containing it as a comonomer. Thus this diol effectively lowers the melting point and the degree of crystallinity. In addition, this diol reacts readily with a compound having carboxyl groups like terephthalic acid to form ester linkages, because its two hydroxyl groups are reactive primary hydroxyl groups.

On the other hand, 1,6-hexanediol is of such a structure that six methylene groups are connected linearly and primary hydroxyl groups are connected to both ends of the chain. It reacts readily with a compound having carboxyl groups to form ester linkages, and it reacts with a dicarboxylic acid to form a polyester having a high degree of crystallinity.

According to this invention, the polyester copolymer is prepared by combining the above-mentioned two kinds of low-molecular weight glycol components which exhibit opposite behaviors with respect to the melting point and the degree of crystallinity. Therefore, it is possible to control easily the melting point and the degree of crystallinity in the desired range.

By this technique, the polyester copolymer having a quite high adhesive strength is obtained. If this polyester copolymer is used as the active ingredient an excellent adhesive, particularly hot-melt adhesive, can be provided. Though the mechanism of the formation of the adhesive having such a high adhesive strength has not fully been elucidated yet, it is considered that the electron density of oxygen in the carbonyl group of terephthalic acid is elevated by the electron donative properties of the methyl group in 2-position of 2-methyl-1,3-propanediol, whereby an intermolecular bond or hydrogen bond which coordinates with atoms on the surface of a base to be adhered is formed. As a result, the adhesive properties are improved. 2-Methyl-1,3-propanediol should account for 1 to 50 mol %, preferably 15 to 40 mol %, in the low-molecular weight glycol component. If it is less than 1 mol %, it does not show the above-mentioned characteristics, and the resulting copolymer becomes excessively high in the melting point and the degree of crystallinity. On the other hand, if it is more than 50 mol %, the resulting polyester copolymer has an excessively low melting point and degree of crystallinity. Moreover, according to this invention, at least one kind of high-molecular weight diol selected from polyalkylene ether glycol and polycaprolactone glycol may be used, as required, as a polymerization reaction component as mentioned above. This high-molecular weight diol provides the resulting copolymer with such performance as abrasion resistance, impact resistance, flexibility, and elastic recovery. These properties are essential for the copolymer in some applications.

The above-mentioned polyalkylene ether glycol includes, for example, diethylene glycol, triethylene glycol, polyethylene glycol, poly(1,2- and 1,3-propylene oxide)glycol, poly tetramethylene oxide)glycol, poly (hexamethylene oxide)glycol, and copolymers thereof. They may be used in combination. These polyalkylene ether glycols should have a number-average molecular weight of 100 to 3000, preferably 100 to 2000. The above-mentioned polycaprolactone glycol is prepared by ring opening polymerization of lactone in the presence of a low-molecular weight glycol such as ethylene glycol with the aid of a proper catalyst. It has a number-average molecular weight of 500 to 4000, preferably 800 to 3000. A preferred example of such lactone is ε-caprolactone, and other usable lactones include enantholactone, β-propiolactone, dimethylpropiolactone, butyrolactone, γ-valerolactone, γ-caprolactone, γ-caprilolactone, crotolactone, δ-valerolactone, and δ-caprolactone. These lactones may be used in combination at the same time. In the reaction of this invention, the high-molecular weight diol component is used in an amount of 0 to 60 wt %, preferably 0 to 40 wt %, based on the weight of the resulting polymer. If it is more than 60%, the resulting copolymer becomes excessively soft.

The polyester copolymer of this invention can be produced by any known process for producing polyester. That is, in one process, the dicarboxylic acid compound and the diol compound undergo direct polycondensation, and in another process, an ester-forming derivative such as lower alkyl ester or halogen derivative of dicarboxylic acid and the diol compound are reacted.

An example of polycondensation process based on ester interchange using a dicarboxylic acid lower alkyl ester is as follows. The ester interchange reaction is performed on dimethyl terephthalate and a mixture of 1,6-hexanediol, 2-methyl-1,3-propanediol, and high-molecular weight diol (the diol mixture being 1.1 to 2.0 times in mole more than the stoichiometric quantity) in a nitrogen stream at 150° to 240° C. under normal pressure with the aid of a common esterification catalyst. Methanol is distilled away, and a catalyst and anticoloring agent are added as required. Then, the reaction product undergoes polycondensation at about 200° to 280° C. under a reduced pressure lower than 5 mmHg. The above-mentioned catalyst includes a great variety of compounds. For example, titanium compounds such as tetramethoxytitanium, tetraethoxytitanium, tetra-n-propoxytitanium, tetra-iso-propoxytitanium, and tetrabutoxytitanium; tin compounds such as di-n-butyl-tin dilaurate, di-n-butyltin oxide, and dibutyltin diacetate; and a combination of an acetate of magnesium, calcium, or zinc and antimony oxide and one of the aforesaid titanium compounds. These catalysts should preferably be used in an amount of 0.002 to 0.8 wt % based on the total copolymer to be formed.

In the above mentioned process for preparing the polyester according to the invention, there may be used also a polyhydric alcohol, such as ethylene glycol, propylene glycol, neopentyl glycol, 1,4-butanediol, 1,4-cyclohexanediol, cyclohexanedimethanol, trimethylolpropane or pentaerythritol.

In addition, the reaction mixture may be incorporated, as required, with anticoloring agent, polymerization accelerator, whitening agent, light stabilizer, and crystallization accelerator.

As the anticoloring agent, a phosphorus-containing compound such as phosphorous acid, triphenyl phosphate, tridecyl phosphite or triphenyl phosphite is effective. This compound is used in an amount in the range of 0.001–0.3 wt. % based on the total copolymers formed.

The copolymer prepared according to the process of this invention can be used in the application areas such as molding material, film material, and adhesive where the conventional polyester copolymers have been used. It exhibits its outstanding performance when used in the application areas such as hot melt adhesive, binder for lamination, blending with other plastics, and polyester elastomer, where a comparatively low melting point and a proper degree of crystallinity are required.

Among many applications of the polyester according to the invention, the adhesive will be illustrated below. The polyester of the invention is particularly effective as an adhesive, because it has both a low melting point and a suitable crystallization degree.

The polyester copolymer comprises a glycol component and a dicarboxylic acid component and, by varying the two components in the combination, the crystallinity, melting point, or the like of the copolymer may be varied over a considerably broad range. It is said that adhesive power of a hot-melt adhesive is determined by crystallinity, degree of polymerization and molecular structure of the adhesive resin. It is considered that the melting point is a main factor of low-temperature adhesion and that the crystallinity and the components of the copolymer are main factors of resistance to washing, resistance to dry cleaning, hand, or the like. Consequently, properties of a polyester resin required when it is used as a hot-melt adhesive are a crystal melting point of 70°–140° C., intrinsic viscosity of at least 0.4 and a crystallinity, i.e. heat of fusion, of 1 –10 cal/g. The adhesive according to the invention satisfy all these requirements.

According to the invention, the above mentioned polyester is useful as an adhesive within the full scope of the above shown definition. Furthermore, the following three polyesters are particularly practical as an adhesive:

(1) a polyester copolymer comprising dicarboxylic acid units substantially comprising terephthalic acid residue and glycol units comprising 99 -50 molar % of 1,6-hexanediol residue and 1 -50 molar % of 2-methyl-1, 3-propanediol residue;

(2) a polyester copolymer composed of
  (A) dicarboxylic acid units made up of 50 to 99 mol % of terephthalic acid residue and 50 to 1 mol % of isophthalic acid residue,
  (B) glycol units made up of 50 to 99 mo 1% of 1,6-hexanediol residue and 50 to 1 mol % of 2-methyl-1,3-propanediol residue, and
  (C) at least one kind of high-molecular weight diol units (in an amount of 0 to 60 wt % based on the copolymer) selected from polyalkylene ether glycol residue and polycaprolactone glycol residue; and (3) a polyester copolymer composed of
  (A) dicarboxylic acid units made up of 50 to 99 mol % of terephthalic acid residue and 50 to 1 mol % of aliphatic dicarboxylic acid residue, (B) glycol units made up of 50 to 99 mol % of 1,6-hexanediol residue and 50 to 1 mol % of 2-methyl-1,3-propanediol residue, and (C) at least one kind of high-molecular weight diol units (in an amount of 0 to 60 wt % based on the copolymer) selected from polyalkylene ether glycol residue and polycarprolactone glycol residue.

In the practical embodiment (2) of the invention, the mixing range is preferred as above so that the resulting polymer may be satisfactory in softening point and elastic property. Thus, terephthalic acid is preferable in the range of 50 to 99 mol %, more preferably 70 to 90 mol %. If it is less than 50 mol %, the resulting polymer shows a lower softening point. On the other hand, isophthalic acid is preferable in the range of 50 to 1 mol %, more preferably 30 to 10 mol %. If it is more than 50 mol %, the resulting polymer shows a much lower softening point.

The dicarboxylic acid component constituting the polyester copolymer used for the adhesive of the above mentioned practical embodiment(s) is a mixture of 50 to 99 mol % of terephthalic acid and 50 to 1 mol % of aliphatic dicarboxylic acid. The mixing range is preferred as above so that the resulting polymer may be satisfactory in a softening point and the elastic property. Thus, terephthalic acid is more preferably in the range of 70 to 90 mol %. If it is less than 50 mol %, the resulting polymer is lower in softening point. On the other hand, the aliphatic dicarboxylic acid is more preferable in the range of 30 to 10 mol %. If it is more than 50 mol %, the resulting polymer is also lower in a softening point.

The above-mentioned aliphatic dicarboxylic acid includes, for instance, adipic acid, suberic acid, azelaic acid, sebacic acid, and dodecanedioic acid.

These aliphatic dicarboxylic acids may be used individually or in combination.

According to the present invention, the polyester copolymer may be used as a solvent-type adhesive in addition to the hot-melt adhesive. The adhesive of the present invention may be used for the production of clothes, packaging, lamination, bookbinding, can manufacturing, shoe making, and crown as well as in wood industries and electric work over a broad range. The adhesive may be used in the form of a mixture with another thermoplastic resin adhesive such as polyethylene, ethylene copolymer, polyamide resin, polypropylene resin or polyurethane resin.

The invention is described with reference to the following nonlimitative examples which demonstrate the production of the polyester copolymer of this invention and the application of the polyester copolymer to hot-melt adhesive.

In the examples, "parts" means "parts by weight" and measurements were taken as follows:

(1) The composition of the copolymer was determined by analyzing the nuclear magnetic resonance spectrum of the copolymer. As for the diol component, each diol residue constituting the copolymer was indicated by mol % based on the total diol residue. As for polyalkylene ether glycol, the residue was indicated by wt % based on the copolymer.

(2) Intrinsic viscosity was determined at 25° C. in a mixed solvent of tetracholoroethane-phenol (3:2).

(3) The melting point and heat of fusion were measured with a differential scanning calorimeter. Sn was used as the reference substance for measuring the heat of fusion.

(4) Bond strength was measured in accordance with JIS K6850 covering the procedure for measuring the tensile shear bond strength of adhesives. A test specimen was prepared by heat bonding two aluminum sheets together under pressure at 150° C. with a 100 μm thick adhesive layer. (The aluminum sheets were treated previously according to JIS K6848.) Tensile shear bond strength was measured using a universal tester, Tensilon UTM-III-500, made by Toyo Baldwin Company.

(5) Peel strength test with Tetoron broadcloth

Polyester resin powder of 60 to 80 mesh was spread at a rate of 25 g/cm$^2$ between two pieces of broadcloths. The cloths were then bonded together by pressing at 150° C. under 2 Kg/cm$^2$ for 20 seconds. A 25-mm wide test piece was cut out of the bonded cloth, and the peel strength was measured using a universal tester, Tensilon UTM-III-500, made by Toyo Baldwin Company.

EXAMPLE 1

In a reactor equipped with a double helical ribbon stirrer were placed 69.9 parts of dimethyl terephthalate, 14.6 parts of 2-methyl-1,3-propanediol, 44.7 parts of 1,6-hexanediol, and 0.07 part of tetrabutoxytitanium catalyst. The reactants were heated at 180° C. for 1 hour and then at 230° C. for 2.5 hour at normal pressure under a nitrogen stream, while distilling out methanol formed in amounts of 89% of the theoretical value. To the reaction mixture was added 0.08 part of tridecyl phosphite. The reactants were heated to 250° C. and the reaction system was evacuated to 0.2 mmHg over 40 minutes. Under this condition, polymerization was carried out for 3.5 hours.

The resulting polyester was found to have an intrinsic viscosity of 0.780 dl/g, a melting point of 122° C., and a heat of fusion of 5.07 cal/g.

The polyester copolymer was also found by the analysis of nuclear magnetic resonance spectrum to contain 29 mol % of 2-methyl-1,3-propanediol and 71 mol % of 1,6-hexanediol.

EXAMPLES 2 TO 7 AND COMPARATIVE EXAMPLES 1 TO 2

Polymerization was carried out under the same conditions as in Example 1, with the reactants varied as shown in Table 1. The measurements of the resulting copolymers are also shown in Table 1.

TABLE 1

|  | | Examples | | | | | | Comparative Examples | |
|---|---|---|---|---|---|---|---|---|---|
|  | Unit | 2 | 3 | 4 | 5 | 6 | 7 | 1 | 2 |
| Reactants charged | | | | | | | | | |
| Dimethyl terephthalate | parts | 62.9 | 62.9 | 62.9 | 52.4 | 52.4 | 52.4 | 69.9 | 69.9 |
| Dimethyl isophthalate | parts | 7.0 | 7.0 | 7.0 | — | — | — | — | — |
| Dimethyl adipate | parts | — | — | — | 15.7 | 15.7 | 15.7 | — | — |
| 2-Methyl-1,3-propanediol | parts | 9.7 | 9.6 | 7.3 | 7.3 | 7.1 | 4.9 | — | — |

TABLE 1-continued

|  | Unit | \multicolumn{6}{c}{Examples} | \multicolumn{2}{c}{Comparative Examples} |
| --- | --- | --- | --- | --- | --- | --- | --- | --- | --- |
|  |  | 2 | 3 | 4 | 5 | 6 | 7 | 1 | 2 |
| 1,6-Hexanediol | parts | 51.1 | 51.1 | 51.1 | 54.3 | 54.3 | 54.3 | 63.9 | 44.7 |
| Diethylene glycol | parts | — | — | 2.9 | — | — | 2.9 | — | — |
| Polytetramethylene oxide glycol | parts | — | 1.8 | — | — | 1.8 | — | — | — |
| 1,4-Butanediol | parts | — | — | — | — | — | — | — | 14.6 |
| Tridecyl phosphite | parts | 0.08 | — | 0.08 | 0.08 | — | 0.08 | 0.08 | 0.08 |
| Irganox 1098 | parts | — | 0.22 | — | — | 0.22 | — | — | — |
| Tetrabutoxytitanium | parts | 0.07 | 0.07 | 0.07 | 0.07 | 0.07 | 0.07 | 0.07 | 0.07 |
| Composition of copolymer |  |  |  |  |  |  |  |  |  |
| 2-Methyl-1,3-propanediol residue | mol % | 21 | 19 | 16 | 15 | 14 | 11 | — | — |
| 1,6-Hexanediol residue | mol % | 79 | 81 | 84 | 85 | 86 | 89 | 100 | 73 |
| 1,4-Butanediol residue | mol % | — | — | — | — | — | — | — | 27 |
| Diethylene glycol residue | wt % | — | — | 1.7 | — | — | 1.8 | — | — |
| Polytetramethylene oxide glycol residue | wt % | — | 1.6 | — | — | 1.6 | — | — | — |
| Intrinsic viscosity | dl/g | 0.820 | 0.851 | 0.791 | 0.772 | 0.834 | 0.843 | 0.855 | 0.801 |
| Melting point | °C. | 125 | 120 | 123 | 114 | 110 | 112 | 157 | 142 |
| Heat of fusion | cal/g | 5.75 | 5.84 | 5.61 | 6.56 | 6.72 | 6.51 | 11.6 | 8.43 |
| Tensile shear bond strength | Kg/cm$^2$ | 67.8 | 65.4 | 65.1 | — | — | — | 43.9 | 38.1 |

Note: In Comparative Examples, the heat bonding temperature was 170° C.

EXAMPLES 8 AND 9

The polymerization was carried out using components in amounts shown in Table 2 under the same polymerization conditions as in Example 1. The results of the measurement are also shown in Table 2.

EXAMPLE 10

In a reactor equipped with a double helical ribbon stirrer were placed 62.9 parts of dimethyl terephthalate, 7.0 parts of dimethyl isophthalate, 9.7 parts of 2-methyl-1,3-propanediol, 51.1 parts of 1,6-hexanediol, and 0.07 part of tetrabutoxytitanium catalyst. The reactants were heated at 180° C. for 1 hour and then at 230° C. for 2.5 hours at normal pressure under a nitrogen stream, while distilling off methanol formed in amounts of 89% of the theoretical value. To the reaction mixture was added 0.08 part of tridecyl phosphite. The reactants were heated to 250° C. and the reaction system was evacuated to 0.2 mmHg over 40 minutes. Under this condition, polymerization was carried out for 3.5 hours.

The resulting polyester was found to have an intrinsic viscosity of 0.820 dl/g, a melting point of 125° C., and a heat of fusion of 5.75 cal/g. The polyester copolymer was also found by the analysis of nuclear magnetic resonance spectrum to contain 21 mol % of 2-methyl-1,3-propanediol and 79 mol % of 1,6-hexanediol.

The tensile shear bond strength of this polyester was 65.4 Kg/cm$^2$, and the T-peel strength was 830 g/25 mm.

EXAMPLES 11 AND 12

Polymerization was carried out under the same conditions as in Example 10, with the reactants varied as shown in Table 3. The measurements of the resulting copolymers are also shown in Table 3.

In addition, the polyesters obtained in the above mentioned Comparative Examples 1 and 2 was examined in respect to T-peel strength and found to have 710 and 750 g/25 mm, respectively.

TABLE 2

|  | Unit | Ex. 8 | Ex. 9 |
| --- | --- | --- | --- |
| Amount charged |  |  |  |
| Dimethyl terephthalate | part | 69.9 | 69.9 |
| 2-Methyl-1,3-propanediol | " | 7.3 | 19.5 |
| 1,6-Hexanediol | " | 54.3 | 38.3 |
| 1,4-Butanediol | " | — | — |
| Tridecyl phosphite | " | 0.08 | 0.08 |
| Tetrabutoxytitanium | " | 0.07 | 0.07 |
| Copolymer constituent |  |  |  |
| 2-Methyl-1,3-propanediol residue | molar % | 15 | 39 |
| 1,6-Hexanediol residue | " | 85 | 61 |
| 1,4-Butanediol residue | " | — | — |
| Instrinsic viscosity | dl/g | 0.810 | 0.832 |
| Melting point | °C. | 131 | 94.5 |
| Heat of fusion | cal/g | 7.39 | 3.49 |
| Tensile shear bond strength | Kg/cm$^2$ | 60.2 | 78.3 |

TABLE 3

|  | Unit | Ex. 10 | Ex. 11 | Ex. 12 |
| --- | --- | --- | --- | --- |
| Reactants charged |  |  |  |  |
| Dimethyl terephthalate | parts | 62.9 | 62.9 | 62.9 |
| Dimethyl isophthalate | parts | 7.0 | 7.0 | 7.0 |
| 2-Methyl-1,3-propanediol | parts | 9.7 | 9.6 | 7.3 |
| 1,6-Hexanediol | parts | 51.1 | 51.1 | 51.1 |
| Diethylene glycol | parts | — | — | 2.9 |
| Polytetramethylene oxide glycol | parts | — | 1.8 | — |
| 1,4-Butanediol | parts | — | — | — |
| Tridecyl phosphite | parts | 0.08 | — | 0.08 |
| Irganox 1098 | parts | — | 0.22 | — |
| Tetrabutoxytitanium | parts | 0.07 | 0.07 | 0.07 |
| Composition of copolymer |  |  |  |  |
| 2-Methyl-1,3-propanediol residue | mol % | 21 | 19 | 16 |
| 1,6-Hexanediol residue | mol % | 79 | 81 | 84 |
| 1,4-Butanediol residue | mol % | — | — | — |
| Diethylene glycol residue | wt % | — | — | 1.7 |
| Polytetramethylene oxide glycol residue | wt % | — | 1.6 | — |
| Instrinsic viscosity | dl/g | 0.820 | 0.851 | 0.791 |

TABLE 3-continued

|  | Unit | Ex. 10 | Ex. 11 | Ex. 12 |
| --- | --- | --- | --- | --- |
| Melting point | °C. | 125 | 120 | 123 |
| Heat of fusion | cal/g | 5.75 | 5.84 | 5.61 |
| Tensile shear bond strength | Kg/cm$^2$ | 65.4 | 65.1 | 60.4 |
| T-peel strength | g/25 mm | 830 | 980 | 950 |

EXAMPLE 13

In a reactor equipped with a double helical ribbon stirrer were placed 52.4 parts of dimethyl terephthalate, 15.7 parts of dimethyl adipate, 7.3 parts of 2-methyl-1,3-propanediol, 54.3 parts of 1,6-hexanediol, and 0.07 part of tetrabutoxytitanium catalyst. The reactants were heated at 180° C. for 1 hour and then at 230° C. for 2.5 hours at normal pressure under a nitrogen stream, while distilling out methanol formed in amounts of 87% of the theoretical value. To the reaction mixture was added 0.08 part of tridecyl phosphite. The reactants were heated to 250° C. and the reaction system was evacuated to 0.2 mmHg over 40 minutes. Under this condition, polymerization was carried out for 3.5 hours.

The resulting polyester was found to have an intrinsic viscosity of 0.772 dl/g, a melting point of 114° C., and a heat of fusion of 6.56 cal/g. The polyester copolymer was also found by the analysis of nuclear magnetic resonance spectrum to contain 15 mol % of 2-methyl-1,3-propanediol and 85 mol % of 1,6-hexanediol.

The tensile shear bond strength of this polyester was 71.4 Kg/cm$^2$, and the T-peel strength was 810 g/25 mm.

EXAMPLES 14, 15 and 16

Polymerization was carried out under the same conditions as in Example 13, with the reactants varied as shown in Table 4. The measurements of the resulting copolymers are also shown in Table 4.

TABLE 4

|  | Unit | Ex. 13 | Ex. 14 | Ex. 15 | Ex. 16 |
| --- | --- | --- | --- | --- | --- |
| Reactants charged |  |  |  |  |  |
| Dimethyl terephthalate | parts | 52.4 | 52.4 | 52.4 | 55.9 |
| Dimethyl adipate | parts | 15.7 | 15.7 | 15.7 | — |
| Dimethyl sebacate | parts | — | — | — | 16.6 |
| 2-Methyl-1,3-propanediol | parts | 7.3 | 7.1 | 4.9 | 9.73 |
| 1,6-Hexanediol | parts | 54.3 | 54.3 | 54.3 | 51.1 |
| Diethylene glycol | parts | — | — | 2.9 | — |
| Polytetramethylene oxide glycol | parts | — | 1.8 | — | — |
| 1,4-Butanediol | parts | — | — | — | — |
| Tridecyl phosphite | parts | 0.08 | 0.08 | — | — |
| Irganox 1098 | parts | — | — | 0.22 | — |
| Tetrabutoxytitanium | parts | 0.07 | 0.07 | 0.07 | 0.07 |
| Composition of copolymer |  |  |  |  |  |
| 2-Methyl-1,3-propanediol residue | mol % | 15 | 14 | 11 | 20 |
| 1,6-Hexanediol residue | mol % | 85 | 86 | 89 | 80 |
| 1,4-Butanediol residue | mol % | — | — | — | — |
| Diethylene glycol residue | wt % | — | — | 1.8 | — |
| Polytetramethylene oxide glycol residue | wt % | — | 1.6 | — | — |
| Intrinsic viscosity | dl/g | 0.772 | 0.834 | 0.843 | 0.811 |
| Melting point | °C. | 114 | 110 | 112 | 125 |
| Heat of fusion | cal/g | 6.56 | 6.72 | 6.51 | 5.78 |
| Tensile shear bond strength | Kg/cm$^2$ | 71.4 | 63.8 | 69.4 | 72.1 |
| T-peel strength | g/25 mm | 810 | 920 | 910 | 940 |

Embodiments of the invention an exclusive right or privilege of which is claimed are defined as follows:

1. A polyester copolymer obtained by copolymerizing
   (A) terephthalic acid or a mixture of not less than 50 mol % of terephthalic acid and at least one kind of dicarboxylic acid selected from aromatic dicarboxylic acids excluding terephthalic acid and aliphatic dicarboxylic acids, said terephthalic acid and dicarboxylic acid optionally forming an ester-forming derivative thereof,
   (B) a low-molecular weight diol composed of 1 to 50 mol % of 2-methyl-1,3-propanediol and 99 to 50 mol % of 1,6-hexanediol, and
   (C) at least one kind of high-molecular weight diol (in such an amount that the high-molecular weight diol component in the copolymer is 0 to 60 wt %) selected from polyalkylene ether glycol and polycaprolactone glycol.

2. A polyester copolymer as claimed in claim 1 in which the component (A) comprises 55 to 99 mol % of terephthalic acid and 50 to 1 mol % of isophthalic acid.

3. A polyester copolymer as claimed in claim 1, in which the component (A) comprises 50 to 99 mol % of terephthalic acid and 50 to 1 mol % of one or more aliphatic dicarboxylic acids.

4. A method of bonding an article to another article by using the polyester copolymer as defined in any of claims 1, 2 and 3, as an adhesive.

* * * * *